US 8,081,824 B2

(12) United States Patent
Li et al.

(10) Patent No.: US 8,081,824 B2
(45) Date of Patent: Dec. 20, 2011

(54) GENERATING SEARCH REQUESTS FROM MULTIMODAL QUERIES

(75) Inventors: Ming Jing Li, Beijing (CN); Wei-Ying Ma, Beijing (CN); Xing Xie, Beijing (CN); Xin Fan, Hefei (CN); Zhiwei Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 728 days.

(21) Appl. No.: 12/247,958

(22) Filed: Oct. 8, 2008

(65) Prior Publication Data
US 2009/0041366 A1  Feb. 12, 2009

Related U.S. Application Data

(62) Division of application No. 11/233,352, filed on Sep. 21, 2005, now Pat. No. 7,457,825.

(51) Int. Cl.
*G06K 9/46* (2006.01)
(52) U.S. Cl. ....................................... 382/190
(58) Field of Classification Search .................. 382/190
See application file for complete search history.

(56) References Cited

U.S. PATENT DOCUMENTS

| | | | |
|---|---|---|---|
| 5,668,897 A | 9/1997 | Stolfo | |
| 5,852,823 A | 12/1998 | De Bonet | |
| 5,873,080 A | 2/1999 | Coden et al. | |
| 6,711,293 B1 | 3/2004 | Lowe | |
| 6,748,398 B2 | 6/2004 | Zhang et al. | |
| 6,961,463 B1 | 11/2005 | Loui et al. | |
| 6,996,280 B1 | 2/2006 | Matsukawa et al. | |
| 7,046,851 B2 | 5/2006 | Keaton et al. | |
| 7,457,825 B2 | 11/2008 | Li et al. | |
| 2002/0087538 A1 | 7/2002 | Abdel-Mottaleb et al. | |
| 2002/0168117 A1 | 11/2002 | Lee et al. | |
| 2004/0126019 A1 | 7/2004 | Ikebe et al. | |
| 2005/0084154 A1 | 4/2005 | Li et al. | |
| 2005/0100219 A1 | 5/2005 | Berkner et al. | |
| 2005/0120311 A1 | 6/2005 | Thrall | |
| 2006/0088191 A1 | 4/2006 | Zhang et al. | |
| 2006/0161403 A1* | 7/2006 | Jiang et al. | 703/2 |
| 2006/0218192 A1 | 9/2006 | Gopalakrishnan | |
| 2007/0067345 A1 | 3/2007 | Li et al. | |
| 2008/0082426 A1 | 4/2008 | Gokturk et al. | |

OTHER PUBLICATIONS

Tang et al., Lecture Notes in Computer Science: Computational Science and Its Applications—ICCSSA 2005: Compact and Robust Image Hashing, May 9-12, 2005, Spinger, vol. 3481, pp. 547-556.*
Yu et al., A Content-Based Image Retrival System for Outdoor Ecology Learning: A Firefly Watching System, 18th International Conference on Advanced Information Networking and Applications, Mar. 29-31, 2004, vol. 2, pp. 112-115.*

(Continued)

*Primary Examiner* — Matthew Bella
*Assistant Examiner* — Dennis Rosario
(74) *Attorney, Agent, or Firm* — Perkins Coie LLP

(57) ABSTRACT

A method and system for generating a search request from a multimodal query that includes a query image and query text is provided. The multimodal query system identifies images of a collection that are textually related to the query image based on similarity between words associated with each image and the query text. The multimodal query system then selects those images of the identified images that are visually related to the query image. The multimodal query system may formulate a search request based on keywords of web pages that contain the selected images and submit that search request to a search engine service.

16 Claims, 14 Drawing Sheets

OTHER PUBLICATIONS

Bodner, Richard C. and Song, Fei, "Knowledge-Based Approaches to Query Expansion in Information Retrieval," Advances of Artificial Intelligence (pp. 146-158), 1996, New York Springer, 14 pages.

Carson, Chad, Belongie, Serge, Greenspan, Hayit, Malik, Jitendra, "Blobworld: Image Segmentation Using Expectation-Maximization and its Application to Image Querying," IEEE Trans. on PAMI, vol. 24, No. 8, 2002 (16 pages).

Chang, Edward, Li, Chen, Wang, James, Mork, Peter, Wiederhold, Gio, "Searching Near-Replicas of Images Via Clustering," Proceedings of SPIE Multimedia Storage and Archiving System VI, vol. 3846, Boston, Sep. 1999 (17 pages).

Flickner, Myron, Sawhney, Harprett, Niblack, Wayne, Ashley, Jonathan, Huang, Qian, Dom, Byron, Gorkani, Monika, Hafner, Jim, Lee, Denis, Petkovic, Dragutin, Steele, David, Yanker, Peter, "Query by Image and Video Content: The QBIC System," IEEE Computer Special Issue on Content-Based Retrieval, vol. 28, No. 9, Sep. 1995 (10 pages).

Hare, Jonathon S., and Lewis, Paul H., "Content-Based Image Retrieval Using a Mobile Device as a Novel Interface," In Proc. of SPIE Storage and Retrieval Methods and Applications for Multimedia 2005, vol. 5682, Jan. 2005 (12 pages).

Jaimes, Alejandro, Chang, Shih-Fu, Loui, Alexander C., "Detection of Non-Identical Duplicate Consumer Photographs," in Proceedings of the Fourth Pacific Rim Conference on Multimedia, vol. 1, Singapore, Dec. 2003 (4 pages).

Ke, Yan, Sukthankar, Rahul, Huston, Larry, "Efficient Near-Duplicate Detection and Sub-Image Retrieval," In Proc. of ACM Multimedia, Nov. 2004 (7 pages).

Kim, Changick, "Content-Based Image Copy Detection," Signal Processing: Image Communication, vol. 18, No. 3, Mar. 2003 (16 pages).

Miller, George A., "WordNet: A Lexical Database for English," Communications of the ACM, vol. 38, No. 11, Nov. 1995 (3 pages).

Noda, Makiko, Sonobe, Hirotaka, Takagi, Saeko, Yoshimoto, Fujiichi, "Cosmos: Convenient Image Retrieval System of Flowers for Mobile Computing Situations," Proceedings of the IASTED Conference on Information Systems and Databases, Tokyo, Japan, Sep. 2002 (6 pages).

Obdrzalek, Stepan and Matas, Jiri, "Image Retrieval Using Local Compact DCT-Based Representation," In Proceedings of the 25th DAGM Pattern Recognition Symposium 2003, Germany, Sep. 2003 (8 pages).

Sebe, N., Tian, Q., Loupias, E., Lew, M., Huang, T., "Evaluation of Salient Point Techniques," Image and Vision Computing, vol. 21, 2003 (10 pages).

Sivic, Josef and Zisserman, Andrew, "Video Google: A Text Retrieval Approach to Object Matching in Videos," Proceedings of the Ninth IEEE International Conference on Computer Vision, Oct. 2003 (8 pages).

Smith, John, R., and Chang, Shih-Fu, "VisualSEEk: A Fully Automated Content-Based Image Query System," In Proceedings of ACM Multimedia, Boston, Nov. 1996 (12 pages).

Sonobe, Hirotaka, Takagi, Saeko and Yoshimoto, Fujichi, "Mobile Computing System for Fish Image Retrieval," Proceedings of International Workshop on Advanced Image Technology, Singapore, Jan. 2004 (6 pages).

Vorhees, Ellen M., "Query Explansion Using Lexical-Semantic Relations," Proceedings of the 17th Annual ACM SIGIR Conference, Dublin, Ireland, 1994 (9 pages).

Wang, James Ze, Wiederhold, Gio, Firschein, Oscar, Wei, Sha Xin, "Content-Based Image Indexing and Searching Using Daubechies' Wavelets," International Journal on Digitial Libraries, vol. 1, No. 4, Springer-Verlag 1998 (18 pages).

Yeh, Tom, Tollmar, Konrad, Darrell, Trevor, "Searching the Web with Mobile Images for Location Recognition," Proceedings of the 2004 IEEE Computer Society Conference on Computer Vision and Pattern Recognition (CVPR '04), 2004 (6 pages).

Yeh, Tom, Grauman, Kristen, Tollmar, Konrad and Darrell, Trevor, "A Picture is Worth a Thousand Keywords: Image-Based Object Search of a Mobile Platform," Proceedings of CHI 2005, Portland, Apr. 2004 (4 pages).

Chen, Zheng, Wenyin, Liu, Hu, Chunhui, Li, Mingjing, Zhang, Hongjiang, "iFind: A Web Image Search Engine," SIGIR'01, Sep. 9-12, 2001, ACM (1 page).

W3C Architecture Domain, "Document Object Model (DOM)," Jan. 19, 2005, Copyright 1997-2005 W3C, 3 pages (Accessed Aug. 5, 2005).

Google, "Google Short Message Service (SMS)," Copyright 2005 Google, 1 page(Accessed Nov. 11, 2005).

Yahoo! Mobile, Copyright 2005 Yahoo! (Accessed Nov. 11, 2005) (1 page) http://mobile.yahoo.com/.

Tae-Gyu, Kim, "Camera Phones to Get 99% of Local Market in 2005," The Korea Times, Nov. 22, 2004 (2 pages).

Google Mobile Search, 2005 Google, [Accessed Nov. 9, 2005], (1 page) http://www.google.com/xhtml/help?hl=en&lr=&ie=UTF-8.

Porter, M.F., "An algorithm for suffix stripping," Program, vol. 14 No. 3, 1980, 7 pages.

Fan, Xin, et al., "Photo-to-Search: Using Multimodal Queries to Search the Web from Mobile Devices," MIR '05, Nov. 10-11, 2005 Singapore, 18 pages.

Gong, Yihong, et al. "Image Indexing and Retrieval Based on Human Perceptual Color Clustering," Robotics Institute, Carnegie Mellon University, Pittsburgh, PA (5 pages).

Gong, Yihong, "Advancing Content-based Image Retrieval by Exploiting Image Color and Region Features," Robotics Institute, Carnegie Mellon University, Pittsburgh, PA (29 pages).

Ferhatosmanoglu, Hakan, et al., "Vector Approximation based Indexing for Non-uniform High Dimensional Data Sets," University of California, Santa Barbara, CIKM 2000, McLean, VA, USA, (8 pages).

Herley, Cormac, "Why Watermarking is Nonsense," Signal Processing, Microsoft Research, Microsoft Corporation.

Jaimes, Alejandro et al., "Detection of Non-Identical Duplicate Consumer Photographs".

Lin, Shu, et al., "An Extendible Hash for Multi-Precision Similarity Querying of Image Databases," Proceedings of the 27th VLDB Conference, Rome, italy, 2001 (12 pages).

Riskin, Eve A., "Optimal Bit Allocation via the Genralized BFOS Algorithm," IEEE Transactions on Information Theory, vol. 37, No. 2, Mar. 1991 (3 pages).

Chang et al., IEEE Multimedia, vol. 4, Issue 3, Jul. 1997, pp. 12-20.

Muneesawang et al., "Advances in Multimedia Information Processing," PCM 2004, Oct. 29, 2004, pp. 642-649.

Srihari et al., Information Retrieval, vol. 2, 2000, pp. 245-275.

Goh et al., MM'04, Oct. 10-16, 2004, New York, New York, pp. 564-571.

Luo et al., "A World Wide Web Based Image Search Engine Using Text and Image Content Features," Department of Information Engineering, The Chinese University of Hong Kong, Electronic Imaging, SPIE vol. 5018 (2003).

Tu et al., "Image Parsing: Unifying Segmentation, Detection, and Recognition," University of California, Los Angeles, CA, 90095 Proceedings of the Ninth IEEE International Conference on Computer Vision (ICCV 2003) 2-Volume Set.

Google, Inc., "Google Frequently Asked Questions: Image Search," http://images.google.com/help/faq_images.html as archived by The Internet Archive http://www.archive.org/, 2001.

Sivic et al., "Efficient object retrieval from videos," Proc. 12th European Signal Processing Conference, Sep. 2004, pp. 1737-1740.

Lowe, D.G., "Local feature view clustering for 3rd object recognition," Proc. 2001 IEEECS Conf. on Computer Vision and Pattern Recognition, vol. 1, Dec. 2001, pp. 682-688.

Carneiro et al., "Flexible spatial models for grouping local image features," Proc. 2004 IEEECS Conf. on Computer Vision and Pattern Recognition, vol. 2, Jul. 2004, pp. 747-754.

* cited by examiner

GENERATING SEARCH REQUESTS FROM MULTIMODAL QUERIES

CROSS REFERENCE TO RELATED APPLICATION

This application is a continuation application of U.S. patent application Ser. No. 11/233,352, filed on Sep. 21, 2005, and entitled "GENERATING SEARCH REQUESTS FROM MULTIMODAL QUERIES," which is incorporated herein in its entirety by reference.

BACKGROUND

Many search engine services, such as Google and Overture, provide for searching for information that is accessible via the Internet. These search engine services allow users to search for display pages, such as web pages, that may be of interest to users. After a user submits a search request or query that includes search terms, the search engine service identifies web pages that may be related to those search terms. To quickly identify related web pages, the search engine services may maintain a mapping of keywords to web pages. This mapping may be generated by "crawling and indexing" the web (i.e., the World Wide Web) to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on. The search engine service then ranks the web pages of the search result based on the closeness of each match, web page popularity (e.g., Google's PageRank), and so on. The search engine service may also generate a relevance score to indicate how relevant the information of the web page may be to the search request. The search engine service then displays to the user links to those web pages in an order that is based on their rankings.

These search engine services may, however, not be particularly useful in certain situations. In particular, it can difficult to formulate a suitable search request that effectively describes the needed information. For example, if a person sees a flower on the side of a road and wants to learn the identity of the flower, the person when returning home may formulate the search request of "picture of yellow tulip-like flower in Europe" (e.g., yellow tulip) in hopes of seeing a picture of the flower. Unfortunately, the search result may identify so many web pages that it may be virtually impossible for the person to locate the correct picture assuming that the person can even accurately remember the details of the flower. If the person has a mobile device, such as a personal digital assistant ("PDA") or cell phone, the person may be able to submit the search request while at the side of the road. Such mobile devices, however, have limited input and output capabilities, which make it both difficult to enter the search request and to view the search result.

If the person, however, is able to take a picture of the flower, the person may then be able to use a Content Based Information Retrieval ("CBIR") system to find a similar looking picture. Although the detection of duplicate images can be achieved when the image database of the CBIR system happens to contain a duplicate image, the image database will not contain a duplicate of the picture of the flower at the side of the road. If a duplicate image is not in the database, it can be prohibitively expensive computationally, if even possible, to find a "matching" image. For example, if the image database contains an image of a field of yellow tulips and the picture contains only a single tulip, then the CBIR system may not recognize the images as matching.

SUMMARY

A method and system for generating a search request from a multimodal query is provided. The multimodal query system inputs a multimodal query that includes a query image and query text. The multimodal query system provides a collection of images along with one or more words associated with each image. The multimodal query system identifies images of the collection that are textually related to the query image based on similarity between associated words and the query text. The multimodal query system then selects those images of the identified images that are visually related to the query image. The multimodal query system may formulate a search request based on keywords of the web pages that contain the selected images and submit that search request to a search engine service, a dictionary service, an encyclopedia service, or the like. Upon receiving the search result, the multimodal query system provides that search result as the search result for the multimodal query.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
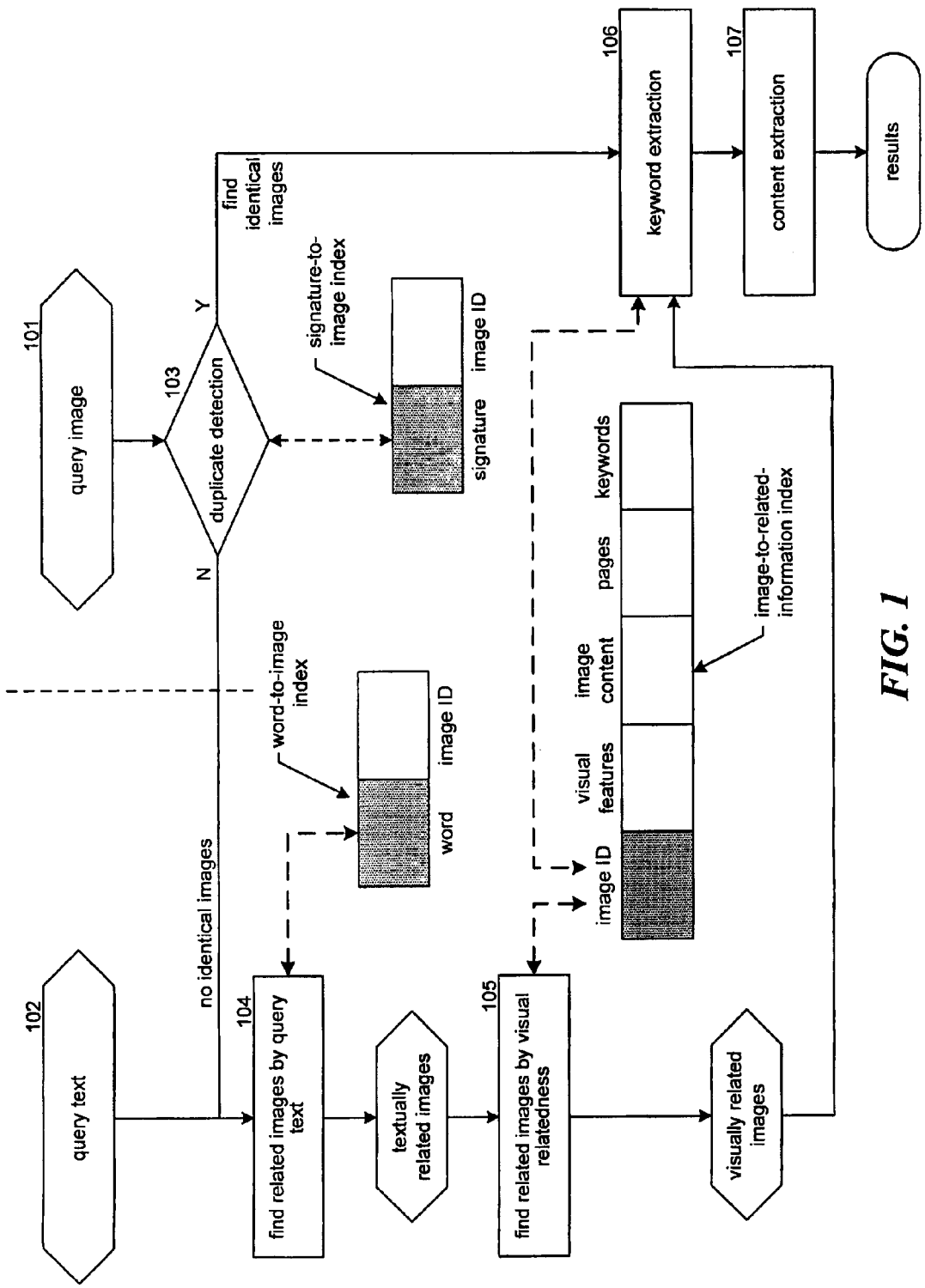
FIG. 1 is a block diagram that illustrates the overall processing of the multimodal query system in one embodiment.

A method and system for generating a search request from a multimodal query is provided. In one embodiment, the multimodal query system inputs a multimodal query that includes an image (i.e., query image) and verbal information (i.e., query text). For example, a multimodal query may include a picture of a flower along with the word "flower." The verbal information may be input as text via a keyboard, audio via a speaker, and so on. The multimodal query system provides a collection of images along with one or more words associated with each image. For example, each image of the collection may have associated words that describe the subject of the image. In the case of an image of a yellow tulip, the associated words may include yellow, tulip, lily, flower, and so on. The multimodal query system identifies images of the collection whose associated words are related to the query text. The identifying of images based on relatedness to the query text helps to reduce the set of images that may be related to the query image. The multimodal query system then selects those images of the identified images that are visually related to the query image. For example, the multimodal query system may use a content base information retrieval ("CBIR") system to determine which of the identified images are most visually similar to the query image. In one embodiment, the multimodal query system may return the selected images as the search result. For example, the multimodal query system may provide links to web pages that contain the selected images. In another embodiment, the multimodal query system may formulate a search request based on keywords of the web pages that contain the selected images and submit that search request to a search engine service, a dictionary service, an encyclopedia service, or the like. For example, the keywords of the web pages that contain the selected images may include the phrases yellow tulip, tulipa, Liliaceae lily flower, Holland yellow flower, and so on, and the formulated search request may be "yellow tulip lily flower Holland." Upon receiving the search result, the multimodal query system provides that search result as the search result for the multimodal query. In this way, the multimodal query system allows the multimodal query to specify needed information more precisely than is specified by a unimodal query (e.g., query image alone or query text alone).

In one embodiment, the multimodal query system may generate from the collection of images a word-to-image index for use in identifying the images that are related to the query text. The word-to-image index maps images to their associated words. For example, the words tulip, flower, and yellow may map to the image of a field of yellow tulips. The multimodal query system may generate the collection of images from a collection of web pages that each contain one or more images. The multimodal query system may assign a unique image identifier to each image of a web page. The multimodal query system may then identify words associated with the image. For each associated word, the multimodal query system adds an entry that maps the word to the image identifier. The multimodal query system uses these entries when identifying images that are related to the query text. The multimodal query system may use conventional techniques to identify the images that are most textually related to the query text based on analysis of the associated words.

In one embodiment, the multimodal query system may generate from the collection of images an image-to-related-information index for use in selecting the identified images that are visually related to the query image. The image-to-related-information index may map each image to a visual feature vector of the image, a bitmap of the image, a web page that contains the image, and keywords of the web page that are associated with the image. For each image, the multimodal query system generates a visual feature vector of features (e.g., average RGB value) that represents the image. When determining whether an image of the collection is visually related to a query image, the multimodal query system generates a visual feature vector for the query image and compares it to the visual feature vector of the image-related-information index. The multimodal query system may identify, from the web page that contains an image, keywords associated with the image and store an indication of those keywords in the image-to-related-information index. The multimodal query system uses the keywords associated with the selected images to formulate a unimodal or text-based search request for the multimodal query.

In one embodiment, the multimodal query system may initially search the collection of images to determine whether there is a duplicate image. If a duplicate image is found, then the multimodal query system may use the keywords associated with that image (e.g., from the image-to-related-information index) to formulate a search request based on the multimodal query. If no duplicate image is found, then the multimodal query system uses the query text to identify images and then selects from those identified images that are textually and visually related to the query image as described above. The multimodal query system may generate a signature-to-image index for identifying duplicate images by comparing signatures of the images of the collection to the signature of a query image. The multimodal query system may use various hashing algorithms to map an image to a signature that has a relatively high likelihood of being unique to that image within the collection (i.e., no collisions). To identify duplicate images, the multimodal query system generates a signature for the query image and determines whether the signature-to-image index contains an entry with the same signature.

FIG. 1 is a block diagram that illustrates the overall processing of the multimodal query system in one embodiment. The input to the multimodal query system is a multimodal query that includes a query image 101 and a query text 102. The system initially generates a signature for the query image. In decision block 103, if the signature-to-image index contains an entry with a matching signature, then the collection contains a duplicate image and the system continues at block 106, else the system continues at block 104. In block 104, the system identifies images that are textually related to the query text using the word-to-image index. Before identifying the images, the system may use various techniques to expand the query text, such as by adding to the query text synonyms of the original words of the query text. The use of the expanded query text may help improve the chances of identifying the most textually related images. The output of block 104 is the identified images that are most textually related. In block 105, the system selects from the identified textually related images those images that are visually related to the query image using the image-to-related-information index. The system may determine the visual distance between the visual feature vector of the query image and the visual feature vector of each image of the collection and select the images with the smallest visual distances as being most visually related. The output of block 105 is the selected visually related images. In block 107, the system formulates a search request based on the images selected in block 105 or on the duplicate image as identified in block 103. The system retrieves the keywords associated with the selected images or the duplicate image and generates a text-based search request from those keywords. In block 107, the system submits the search request to a search engine service, a dictionary service, an encyclopedia service, or the like. The system then returns the search result provided by the search engine as the search result for the multimodal query.

Figure 2:
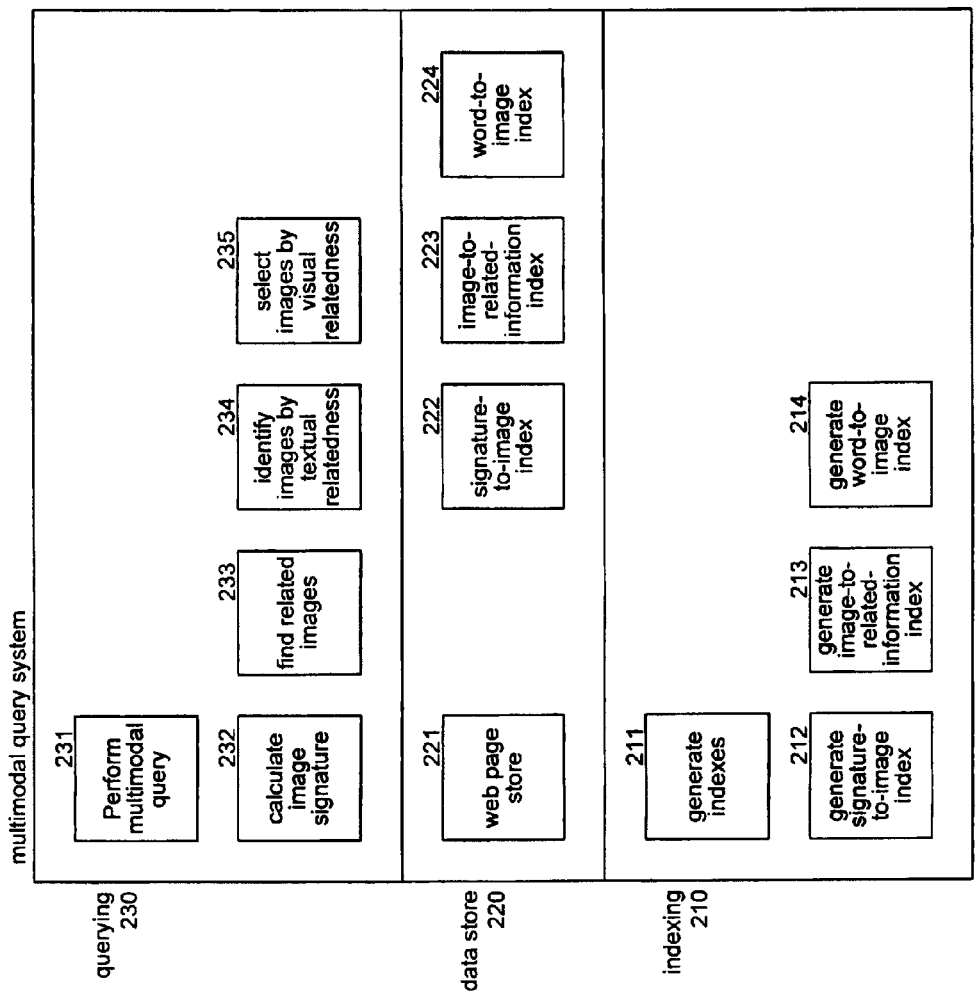
FIG. 2 is a block diagram that illustrates components of the multimodal query system in one embodiment.

FIG. 2 is a block diagram that illustrates components of the multimodal query system in one embodiment. The multimodal query system includes an indexing component 210, a data store 220, and a querying component 230. The indexing component generates the indexes from a collection of web pages. The indexing component includes a generate indexes component 211, a generate signature-to-image index component 212, a generate image-to-related-information index component 213, and a generate word-to-image index component 214. The generate indexes component invokes the other components of the indexing component to generate the appropriate index. The data store 220 includes a web page store 221, a signature-to-image index 222, an image-to-related-information index 223, and a word-to-image index 224. The web page store contains a collection of web pages from which the indexes are generated. The index may be organized using various data structures such as hash tables, B-trees, ordered list, and so on. In addition, the indexes may be represented by a single data structure or separate data structures. The querying component 230 includes a perform multimodal query component 231, a calculate image signature component 232, a find related images component 233, an identify images by textual relatedness component 234, and a select images by visual relatedness component 235. The perform multimodal query component is invoked to perform a multimodal query on an input query image and an input query text. The component invokes the calculate image signature component to generate a signature for the query image for use in determining whether the collection of images contains a duplicate of the query image. The component also invokes the find related images component to find images that are related when no duplicate image has been found. The find related images component invokes the identify images by textual relatedness component and the select images by visual relatedness component to find the related images. The perform multimodal query component then formulates a text-based search request based on the keywords associated with the related images and submits the search request to a search engine service, a dictionary service, an encyclopedia service, or the like to generate the search result for the multimodal query.

The computing devices on which the multimodal query system may be implemented may include a central processing unit, memory, input devices (e.g., keyboard and pointing devices), output devices (e.g., display devices), and storage devices (e.g., disk drives). The memory and storage devices are computer-readable media that may contain instructions that implement the multimodal query system. In addition, the data structures may be stored or transmitted via a data transmission medium, such as a signal on a communications link. Various communications links may be used to connect components of the system, such as the Internet, a local area network, a wide area network, a point-to-point dial-up connection, a cell phone network, and so on.

Embodiments of the multimodal query system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The devices may include cell phones, personal digital assistants, smart phones, personal computers, programmable consumer electronics, digital cameras, and so on.

The multimodal query system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 3:
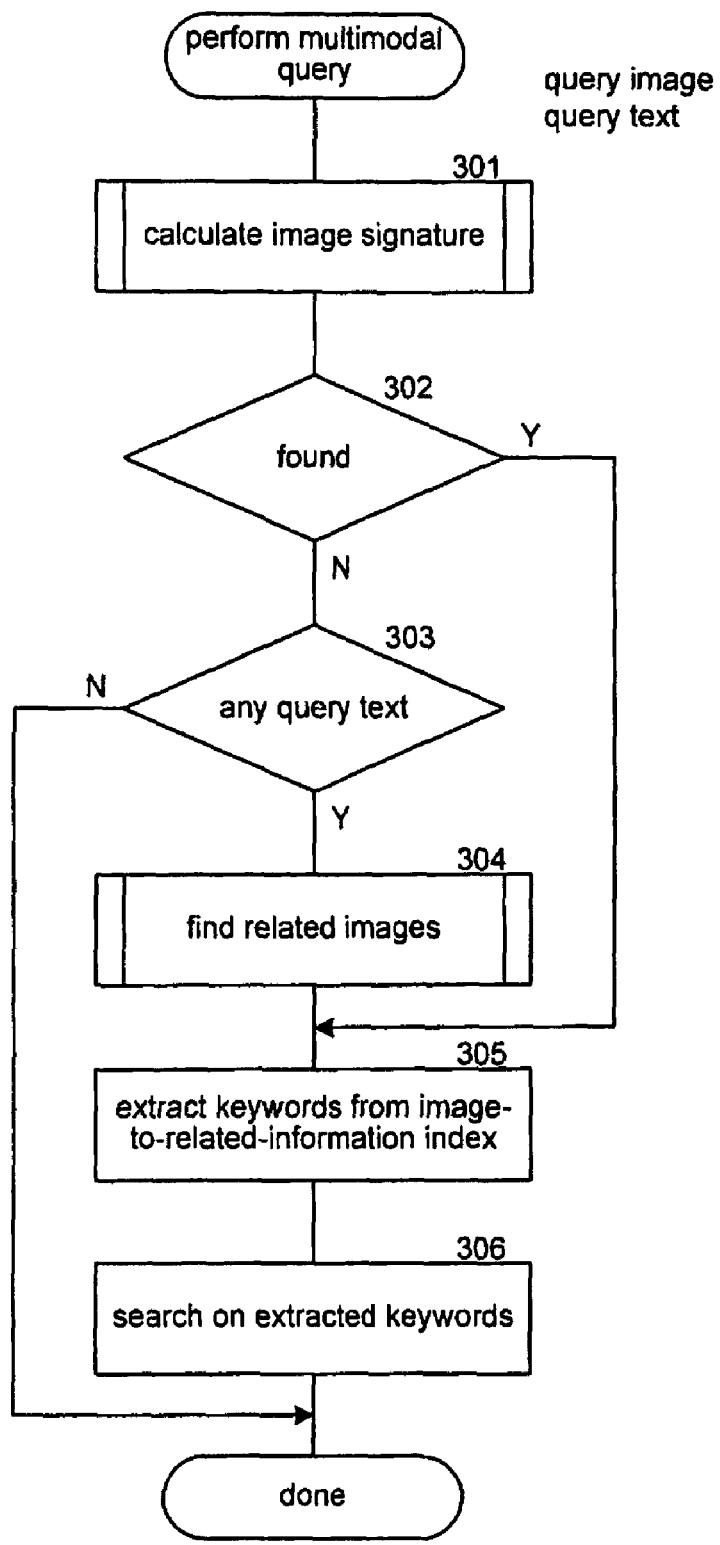
FIG. 3 is a flow diagram that illustrates the processing of the perform multimodal query component in one embodiment.

FIG. 3 is a flow diagram that illustrates the processing of the perform multimodal query component in one embodiment. The component is passed a multimodal query that includes a query image and a query text. The query text includes one or more query words. In block 301, the component invokes the calculate image signature component to calculate the signature of the query image. In decision block 302, if the signature-to-image index contains the calculated signature, then a duplicate image has been found and the component continues at block 305, else the component continues at block 303. In decision block 303, if query text was provided (e.g., not blank), then the component continues at block 304, else the component completes without performing the search. In block 304, the component invokes the find related images component to find images related to the query image. In block 305, the component extracts keywords from the image-to-related-information index for the related images or the duplicate image. In block 306, the component formulates a search request based on the keywords and submits the search request to a search engine. The component then completes.

Figure 4:
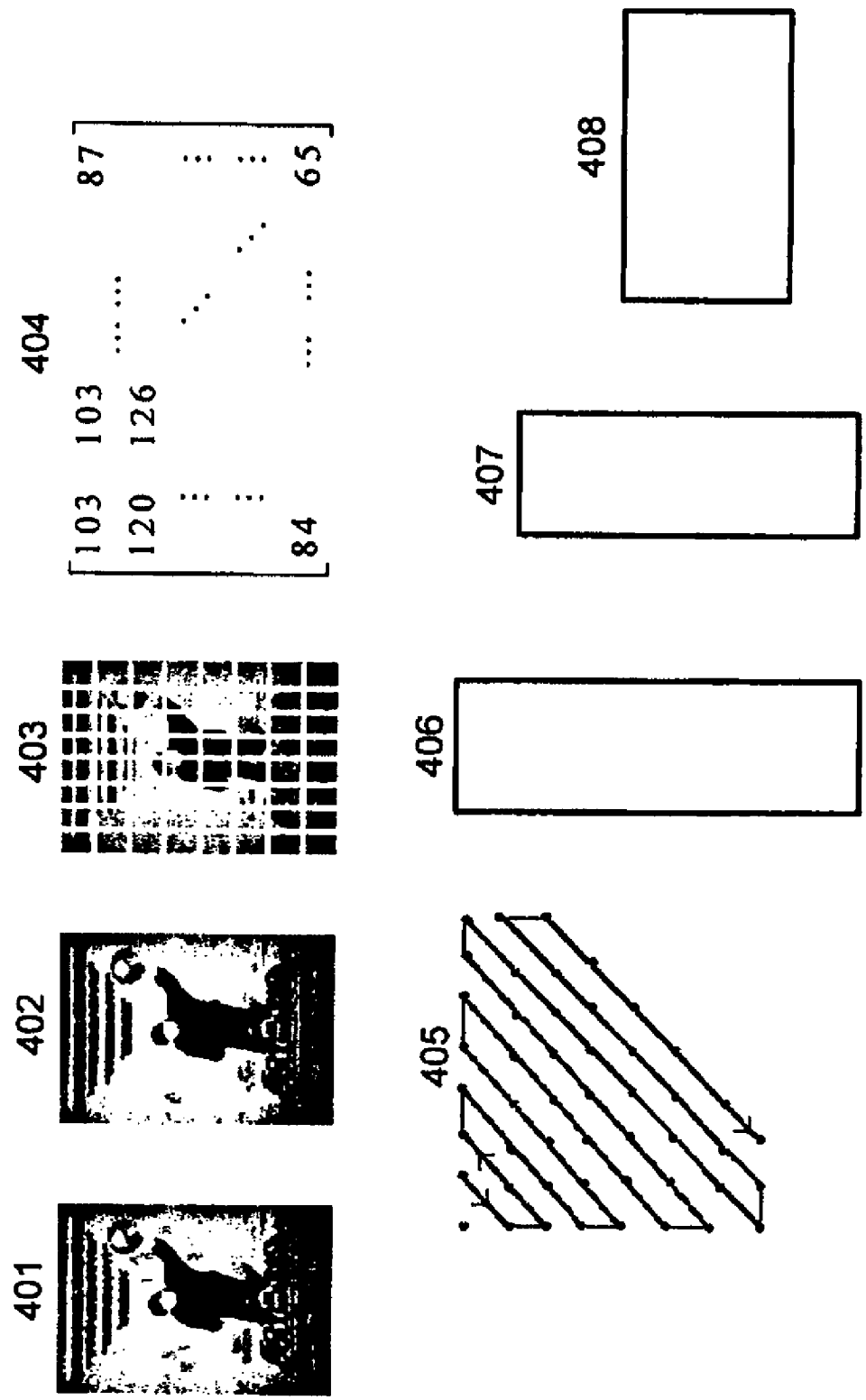
FIG. 4 is a diagram that illustrates the generating of a signature of an image in one embodiment.

FIG. 4 is a diagram that illustrates the generating of a signature of an image in one embodiment. Image 401 represents the image for which the signature is to be generated. Initially, the system converts the image to a gray level image as represented by image 402. The system then divides the image into blocks (e.g., 8-by-8 blocks) as illustrated by image 403. The system then calculates the average intensity of each block to generate matrix 404 as indicated by the following equation:

$$I_{ij} = \frac{\sum_{x=0}^{w-1}\sum_{y=0}^{h-1} \text{Int}(x,y)}{w \cdot h}, \quad i = 0, \ldots 6, 7, j = 0, \ldots 6, 7 \qquad (1)$$

where $I_{ij}$ is the average intensity for block ij and x and y represent the pixels of block ij. The system then performs a two-dimensional discrete cosine transform ("DCT") on the matrix. The system discards the DC coefficient of the DCT matrix and selects 48 AC coefficients of the DCT matrix in a zigzag pattern as illustrated by pattern 405 resulting in an AC coefficients vector 406. The system then performs a principal component analysis ("PCA") to generate a 32-dimension feature vector 407 as illustrated by the following equation:

$$Y_n = P^T A_m \qquad (2)$$

where $Y_n$ represents the 32-dimension feature vector, $A_m$ represents the 48 AC coefficients, and P represents an m×n transform matrix whose columns are the n orthonormal eigenvectors corresponding to the first n largest eigenvalues of the covariance matrix $\Sigma_{A_m}$, and $P^T P = I_n$. The system may train the transform matrix using a collection of sample web pages.

Finally, the system generates a 32-bit hash value 408 from the 32-dimension feature vector by setting the value of each of the 32 bits to 1 if the corresponding 32-dimension feature vector is greater than 0, and to 0 otherwise. One skilled in the art will appreciate that many different algorithms may be used to generate a signature for an image.

Figure 5:
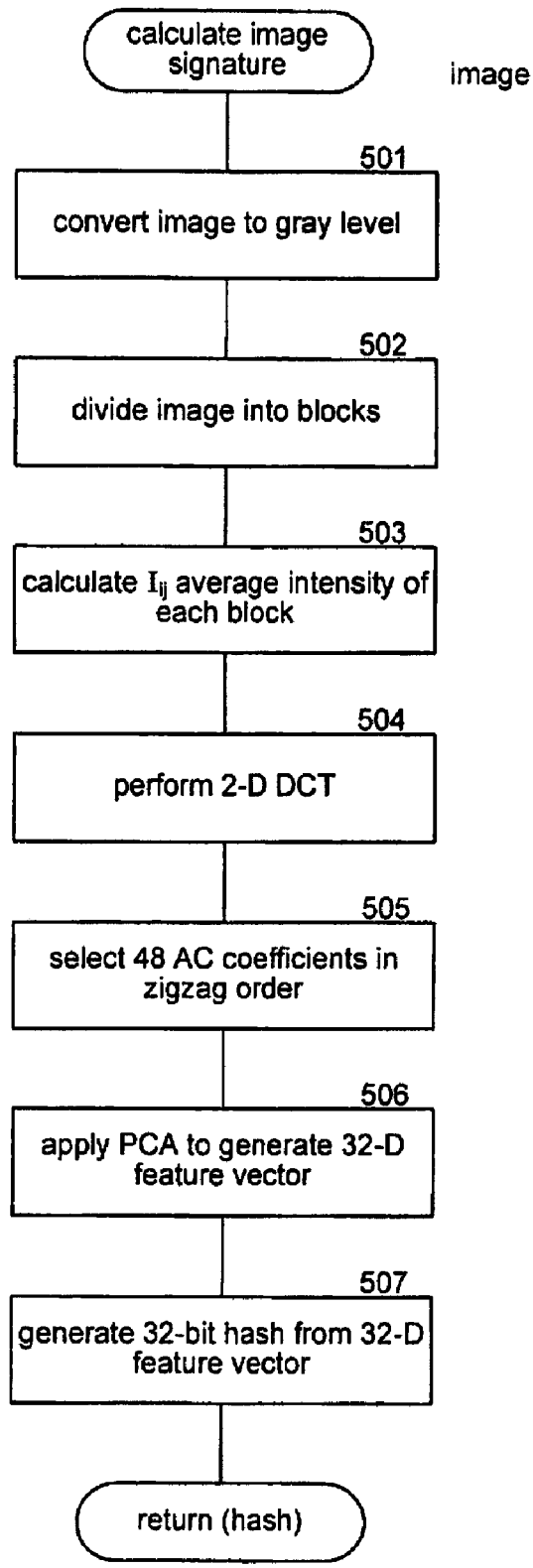
FIG. 5 is a flow diagram that illustrates the processing of the calculate image signature component in one embodiment.

FIG. 5 is a flow diagram that illustrates the processing of the calculate image signature component in one embodiment. The component is passed an image and generates a signature for the image. In block 501, the component converts the image into a gray level image. In block 502, the component divides the image into blocks. In block 503, the component calculates the average intensity of each block to generate an intensity matrix. In block 504, the component performs a two-dimensional discrete cosine transform on the intensity matrix. In block 505, the component extracts 48 AC coefficients from the DCT matrix. In block 506, the component performs a PCA to generate a 32-dimension feature vector from the 48 AC coefficients. In block 507, the component generates a 32-bit signature from the 32-dimension feature vector and then completes.

Figure 6:
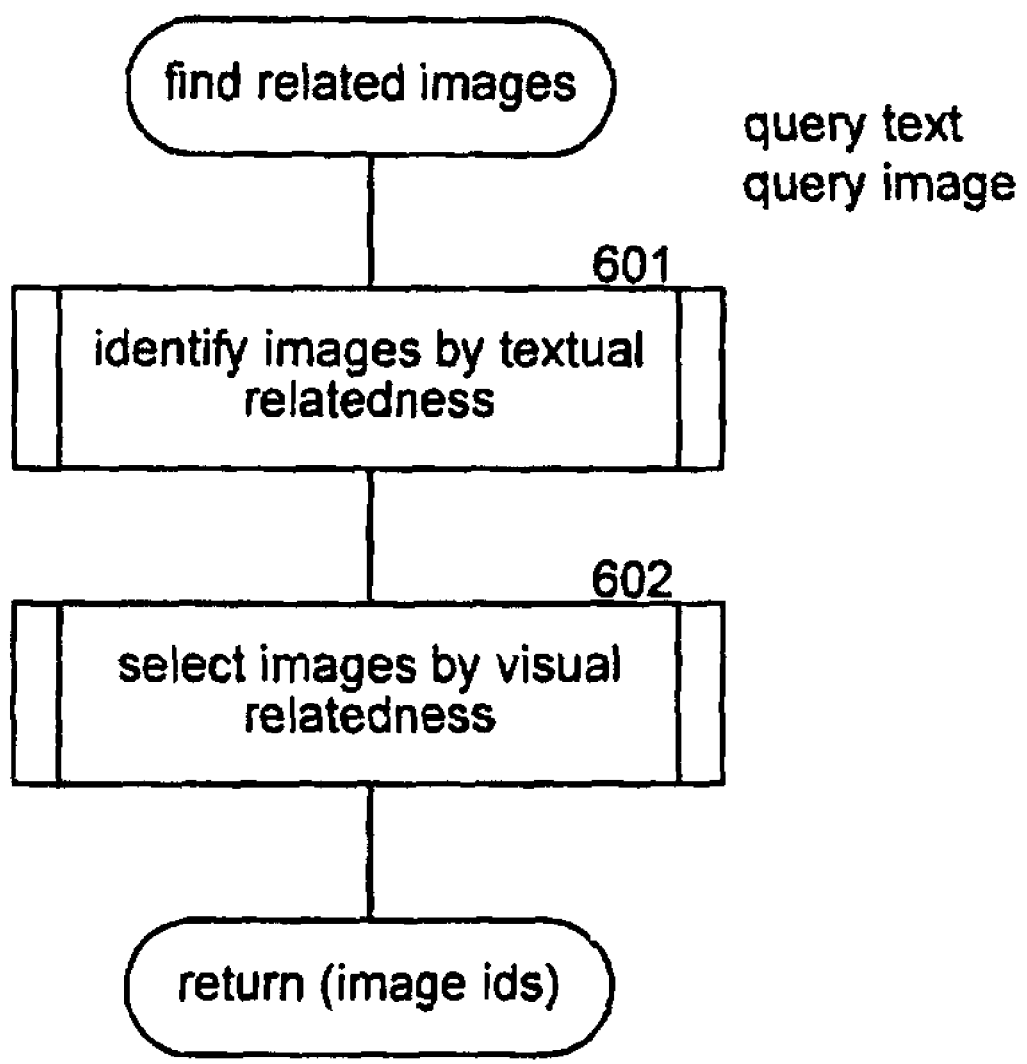
FIG. 6 is a flow diagram that illustrates the processing of the find related images component in one embodiment.

FIG. 6 is a flow diagram that illustrates the processing of the find related images component in one embodiment. The component is passed a multimodal query containing a query image and a query text and returns an indication of images that are related to the multimodal query. In block 601, the component invokes the identify images by textual relatedness component to identify images that are related to the query text. In block 602, the component invokes the select images by visual relatedness component to select those identified images that are visually related to the query image. The component then returns the identifiers of the selected images as the related images.

Figure 7:
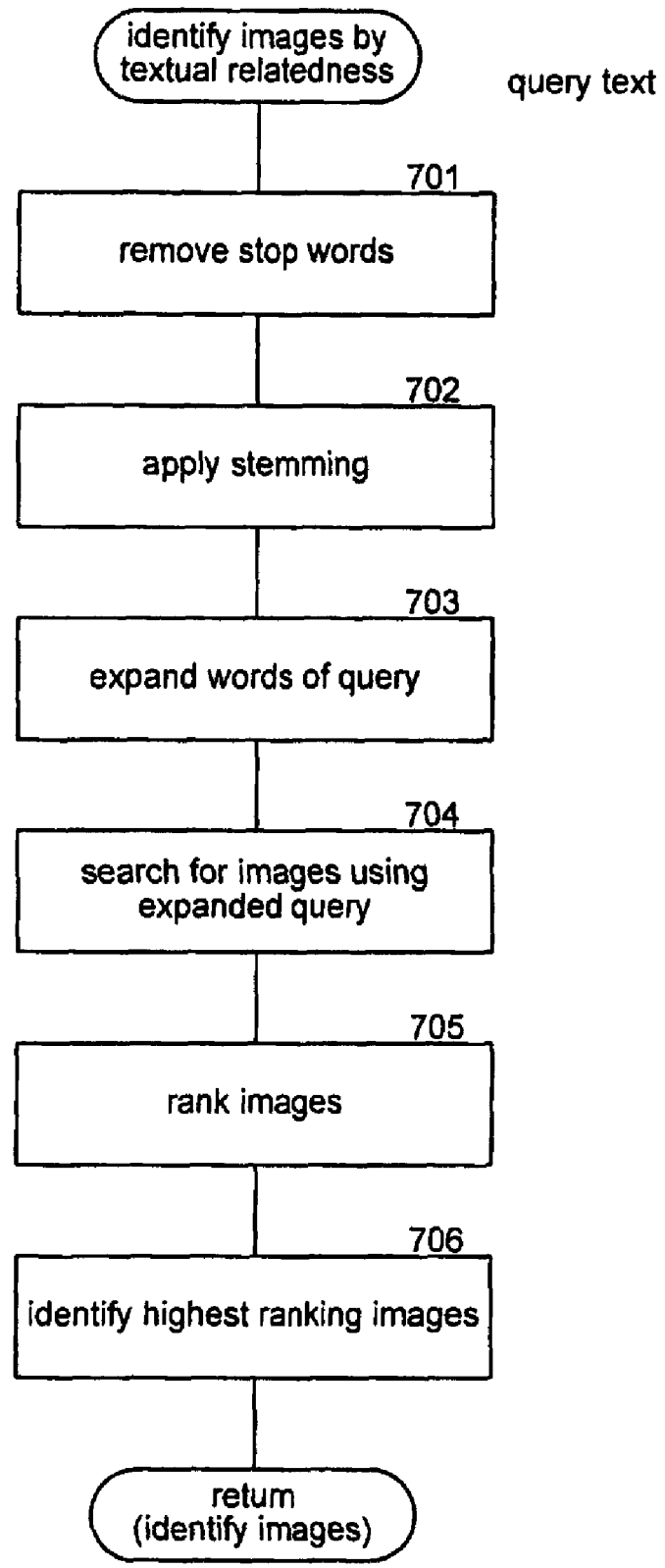
FIG. 7 is a flow diagram that illustrates the processing of the identify images by textual relatedness component in one embodiment.

FIG. 7 is a flow diagram that illustrates the processing of the identify images by textual relatedness component in one embodiment. The component is passed a query text and returns the identification of images that are related to the query text as indicated by the word-to-image index. In block 701, the component removes stop words (e.g., a, the, and an) from the query text. In block 702, the component applies stemming rules, such as the Porter stemming algorithm, to generate the stems for the words of the query text. For example, the words flowers, flowering, and flowered may be transformed to their stem flower. In block 703, the component expands the words of the query text to include synonyms and hyponyms using, for example, the Wordnet system. For example, the word flower may be expanded to include bloom, blossom, heyday, efflorescence, flush, peony, lesser celandine, pilewort, *Ranunculus ficaria*, anemone, wildflower, and so on. In block 704, the component searches the word-to-image index to locate images with associated words that are related to the expanded query text. In block 705, the component ranks the images based on how well the associated words match the expanded query text. In block 706, the component identifies the highest ranking images and returns the identified images. The component may treat words associated with each image as a document and use standard query techniques to find the documents that are most closely related to the expanded query text.

Figure 8:
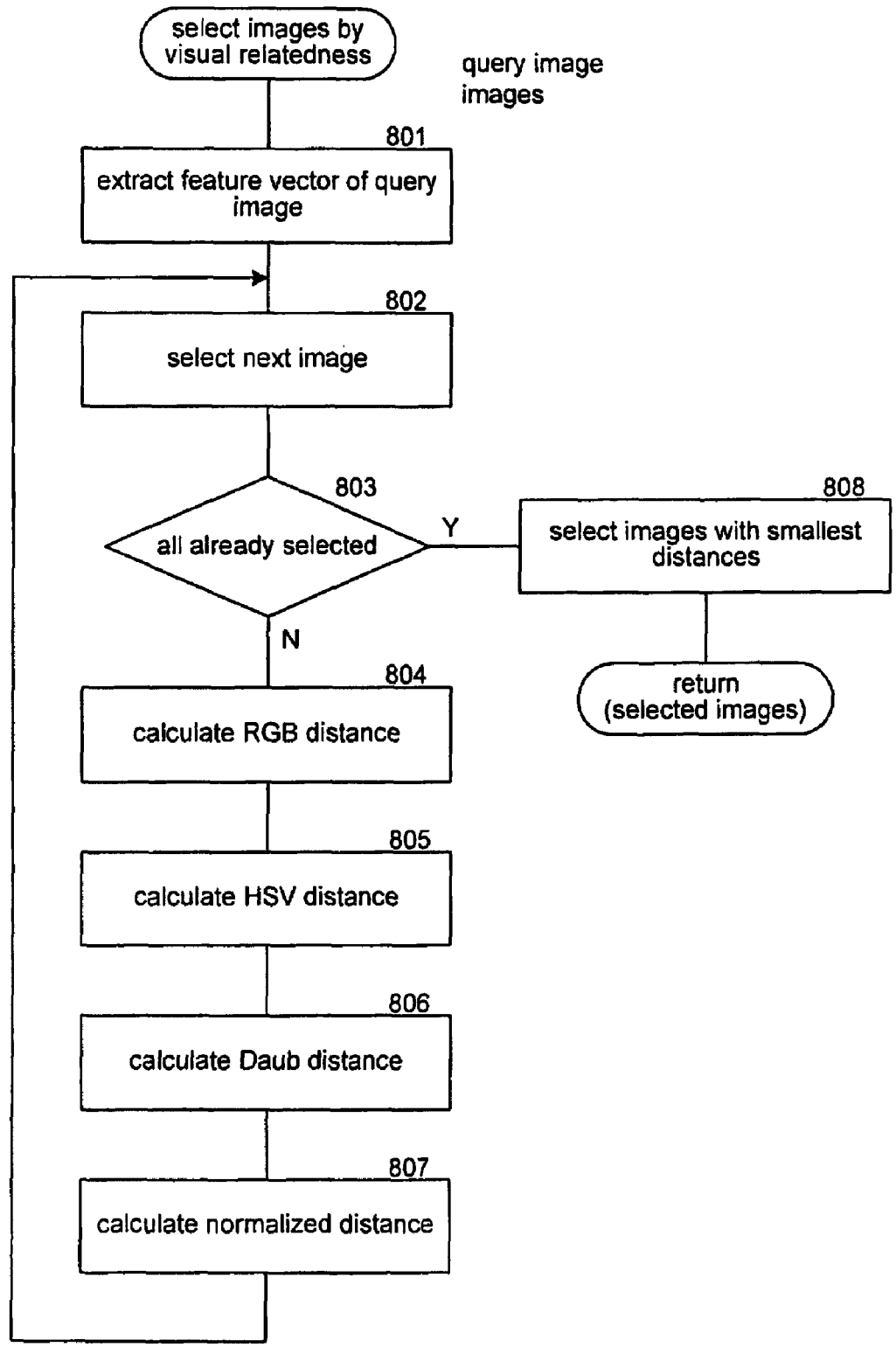
FIG. 8 is a flow diagram that illustrates the processing of the select images by visual relatedness component in one embodiment.

FIG. 8 is a flow diagram that illustrates the processing of the select images by visual relatedness component in one embodiment. The component is passed the query image and an indication of the images that were identified based on textual relatedness. The component selects those identified images that are visually related to the query image. In block 801, the component extracts a feature vector for the query image. In one embodiment, the feature vector for an image includes three features: a 64-element RGB color histogram feature, a 64-element HSV color histogram feature, and a 192-element Daubechies' wavelet coefficient feature. One skilled in the art will appreciate that any of a variety of well-known techniques can be used to generate a feature vector for an image. In blocks 802-807, the component loops determining the distance between the feature vector of the query image and the feature vector of each image of the collection. In block 802, the component selects the next image. In decision block 803, if all the images have already been selected, then the component continues at block 808, else the component continues at block 804. In block 804, the component calculates the RGB distance between the selected image and the query image. In block 805, the component calculates the HSV distance between the selected image and the query image. In block 806, the component calculates the Daubechies' distance between the selected image and the query image. In block 807, the component calculates the normalized distance between the selected image and the query image as represented by the following equation:

$$D_j = w_{RGB}\mathfrak{N}(\|F_{RGB}^{query} - F_{RGB}^j\|_1) + \\ w_{HSV}\mathfrak{N}(\|F_{HSV}^{query} - F_{HSV}^j\|_1) + w_{Daub}\mathfrak{N}(\|F_{Daub}^{query} - F_{Daub}^j\|_1), \\ j = 1, \ldots, M \quad (3)$$

where $F_{RGB}^{query}$, $F_{HSV}^{query}$, and $F_{Daub}^{query}$ are the feature vectors of the query image and $F_{RGB}^j$, $F_{HSV}^j$, and $F_{Daub}^j$ are the feature vectors of the selected image, and $\mathfrak{N}$ is a normalization operator. In one embodiment, the component uses the constant weights of $w_{RGB}=0.3$, $w_{HSV}=0.5$, and $w_{Daub}=0.2$. The component then loops to block 802 to select the next image. In block 808, the component selects the images with the smallest distances and returns the selected images.

Figure 9:
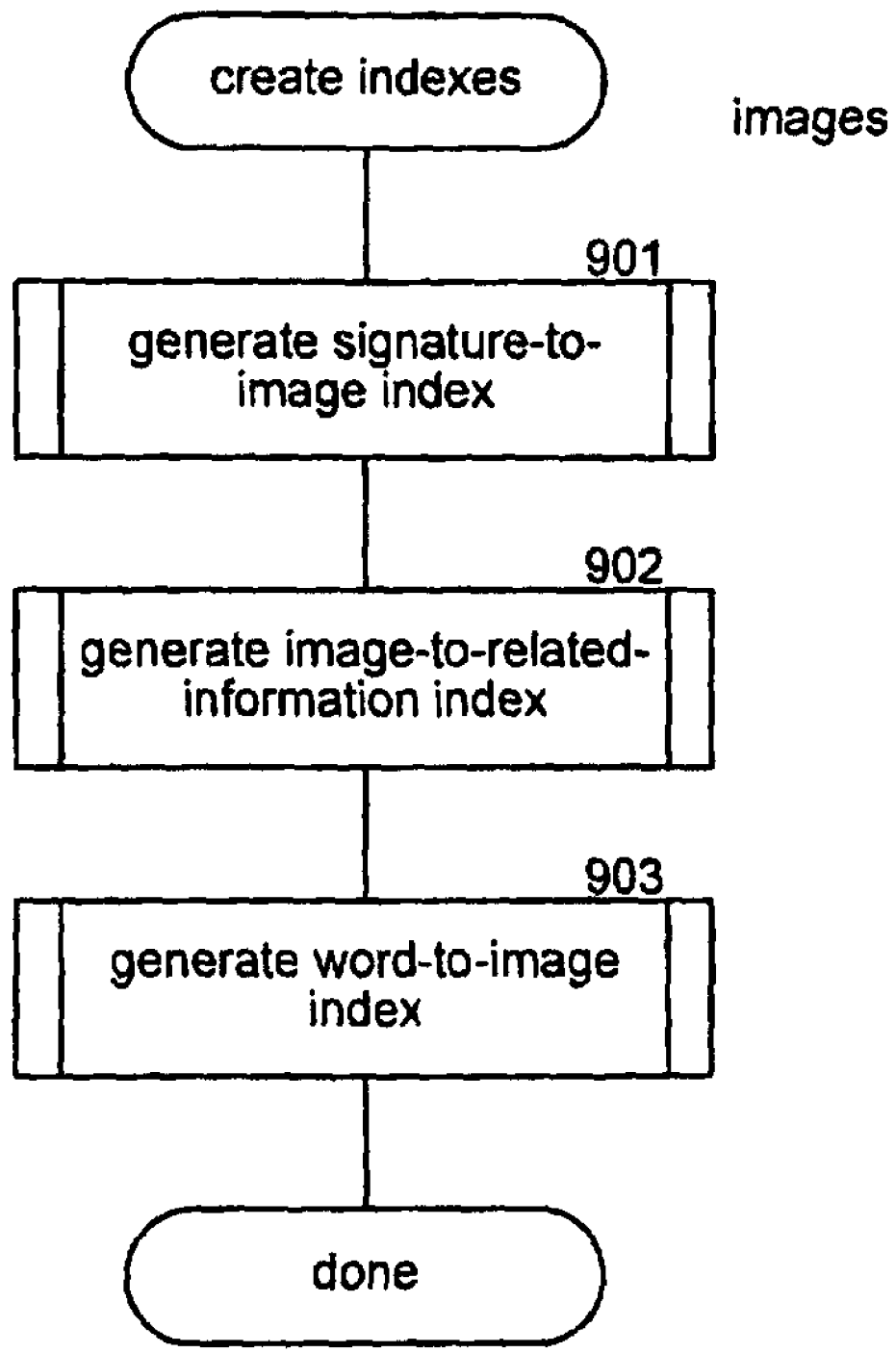
FIG. 9 is a flow diagram that illustrates the processing of the create indexes component in one embodiment.

FIGS. 9-14 are flow diagrams that illustrate the creation of the indexes. FIG. 9 is a flow diagram that illustrates the processing of the create indexes component in one embodiment. The component is passed a collection of web pages that contain images. In block 901, the component invokes the generate signature-to-image index component. In block 902, the component invokes the generate image-to-related-information index component. In block 903, the component invokes the generate word-to-image index component. The component then completes.

Figure 10:
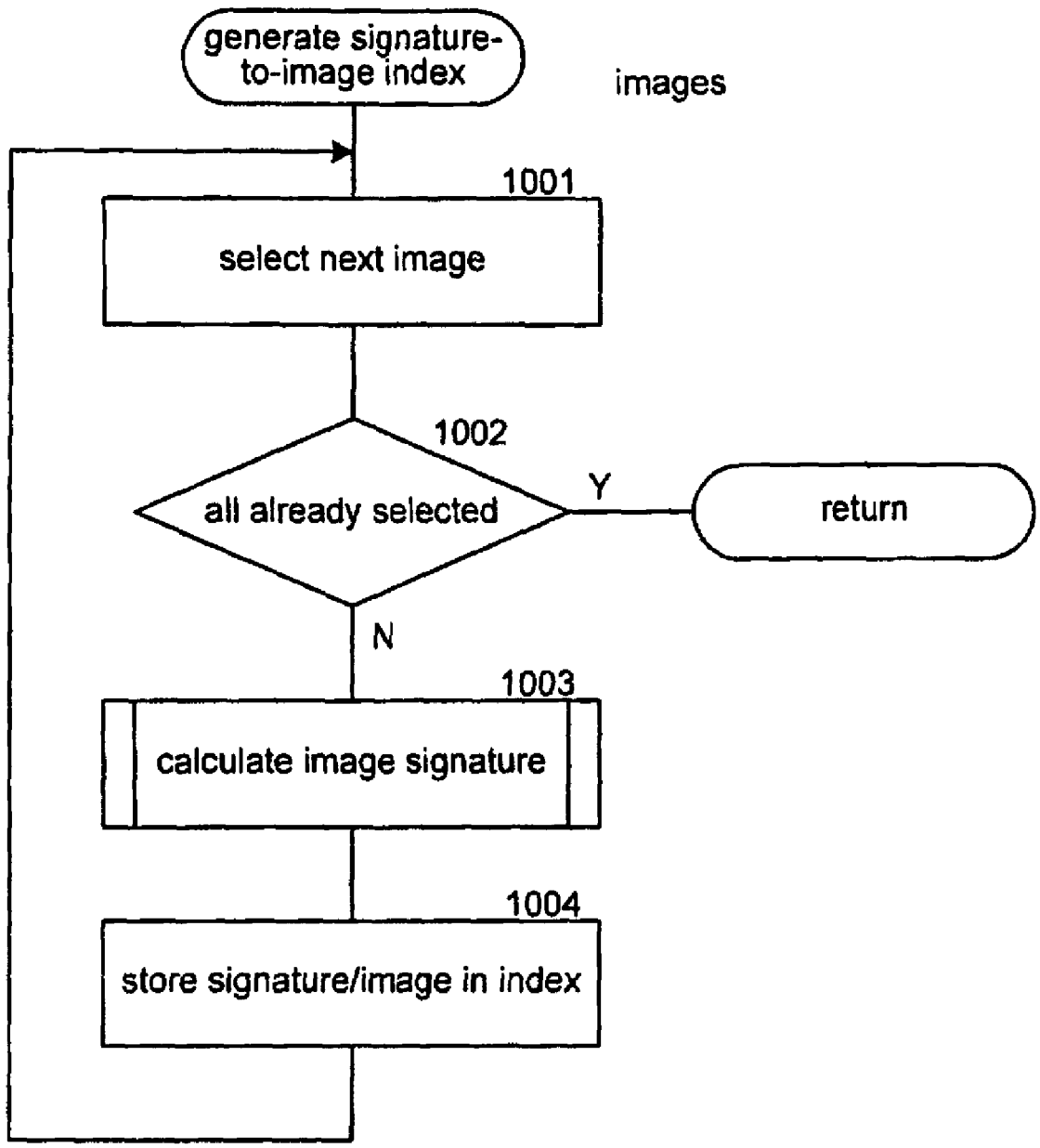
FIG. 10 is a flow diagram that illustrates the processing of the generate signature-to-image index component in one embodiment.

FIG. 10 is a flow diagram that illustrates the processing of the generate signature-to-image index component in one embodiment. The component is passed the images of the web pages and calculates a signature for each image and stores a mapping of that signature to the image. In block 1001, the component selects the next image and assigns to it a unique image identifier. In decision block 1002, if all the images have already been selected, then the component returns, else the component continues at block 1003. In block 1003, the component invokes the calculate image signature component to calculate the signature for the selected image. In block 1004, the component stores an entry in the signature-to-image index that maps the signature to the image identifier and then loops to block 1001 to select the next image.

Figure 11:
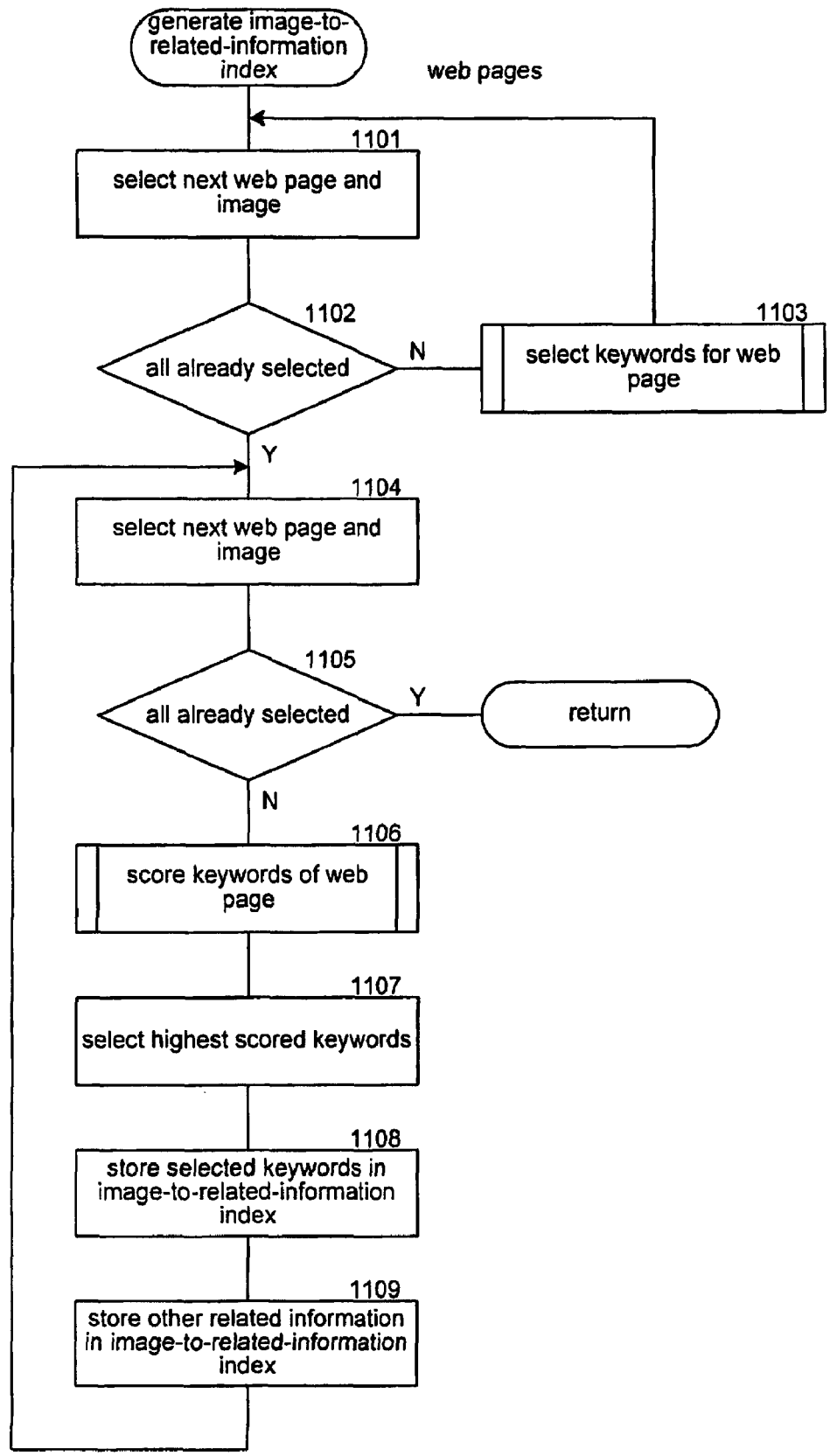
FIG. 11 is a flow diagram that illustrates the processing of the generate image-to-related-information index component in one embodiment.

FIG. 11 is a flow diagram that illustrates the processing of the generate image-to-related-information index component in one embodiment. The component is passed a collection of web pages and generates a mapping of the images of the web pages to the corresponding keywords. In blocks 1101-1103, the component loops selecting each web page and image combination and identifies the keywords for the image of the web page (i.e., a web page can have multiple images). In block 1101, the component selects the next web page and image combination. In decision block 1102, if all the web page and image combinations have already been selected, then the component continues at block 1104, else the component continues at block 1103. In block 1103, the component invokes the select keywords for web page component and then loops to block 1101 to select the next web page and image combination. In blocks 1104-1108, the component loops selecting the highest scored keywords of each web page for each image. In block 1104, the component selects the next web page and image combination. In decision block 1105, if all the web page and image combinations have already been selected, the component returns, else the component continues at block 1106. In block 1106, the component invokes the score keywords of web page component. In block 1107, the component selects the highest scored keywords. In block 1108, the component stores an entry in the image-to-related-information index that maps the image identifier of the image to the keywords. In block 1109, the component stores other related information, such as the visual feature vector for the image and the identification of the web page, in the entry of the image-to-related-information index. The component then loops to block 1104 to select the next web page and image combination.

Figure 12:
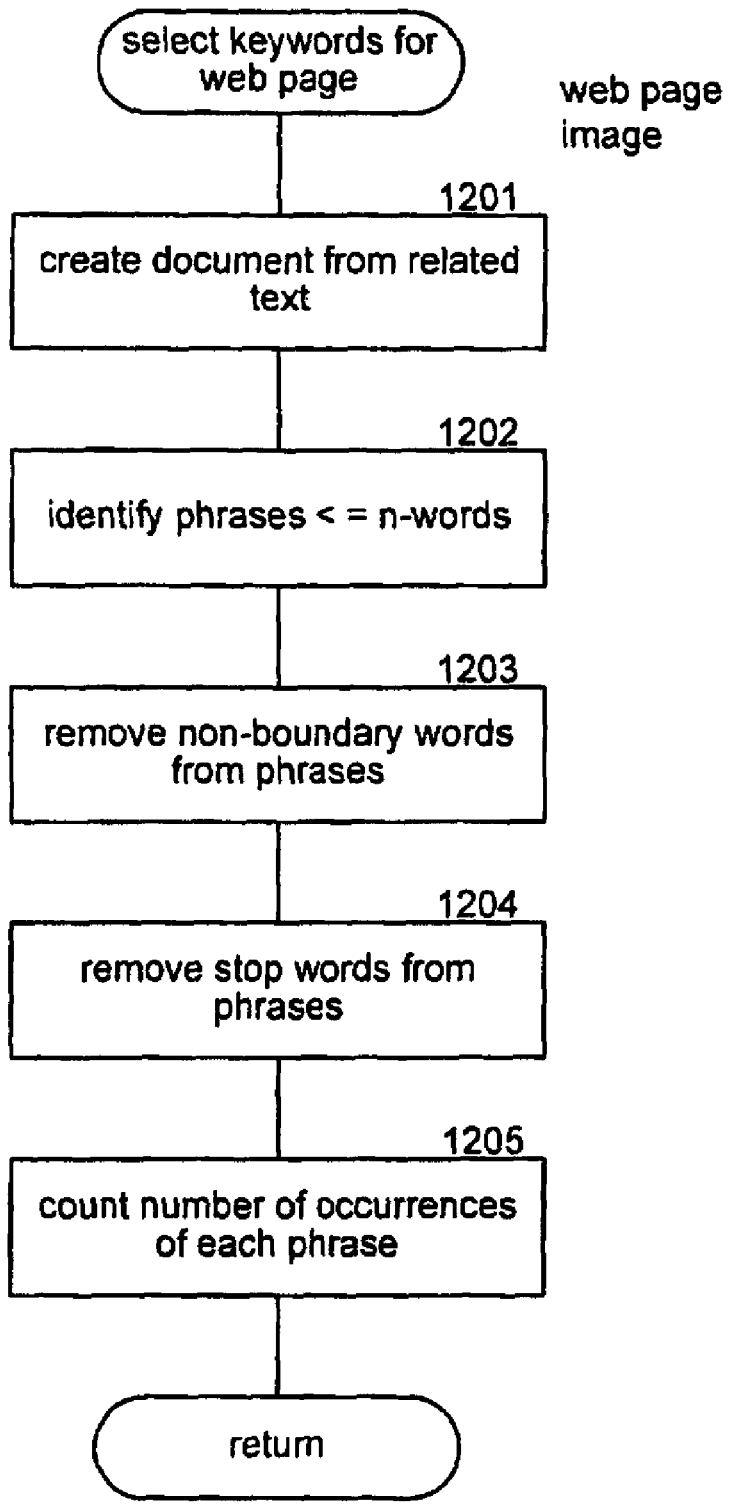
FIG. 12 is a flow diagram that illustrates the processing of the select keywords for web page component in one embodiment.

FIG. 12 is a flow diagram that illustrates the processing of the select keywords for web page component in one embodiment. The component is passed a web page along with the identification of an image. The component identifies from that web page the keywords associated with the image. In block 1201, the component creates a document from the text of the web page that is related to the image. For example, the component may analyze the document object model ("DOM") representation of the web page to identify text that surrounds the image. In block 1202, the component identifies phrases within the document such as all possible phrases of length four or less. In block 1203, the component removes non-boundary words (e.g., "a," "the," "to") from the ends of the phrases. In block 1204, the component removes stop words from the phrases. In block 1205, the component counts the number of occurrences of each phrase within the document. The component then returns the phrases as the keywords.

Figure 13:
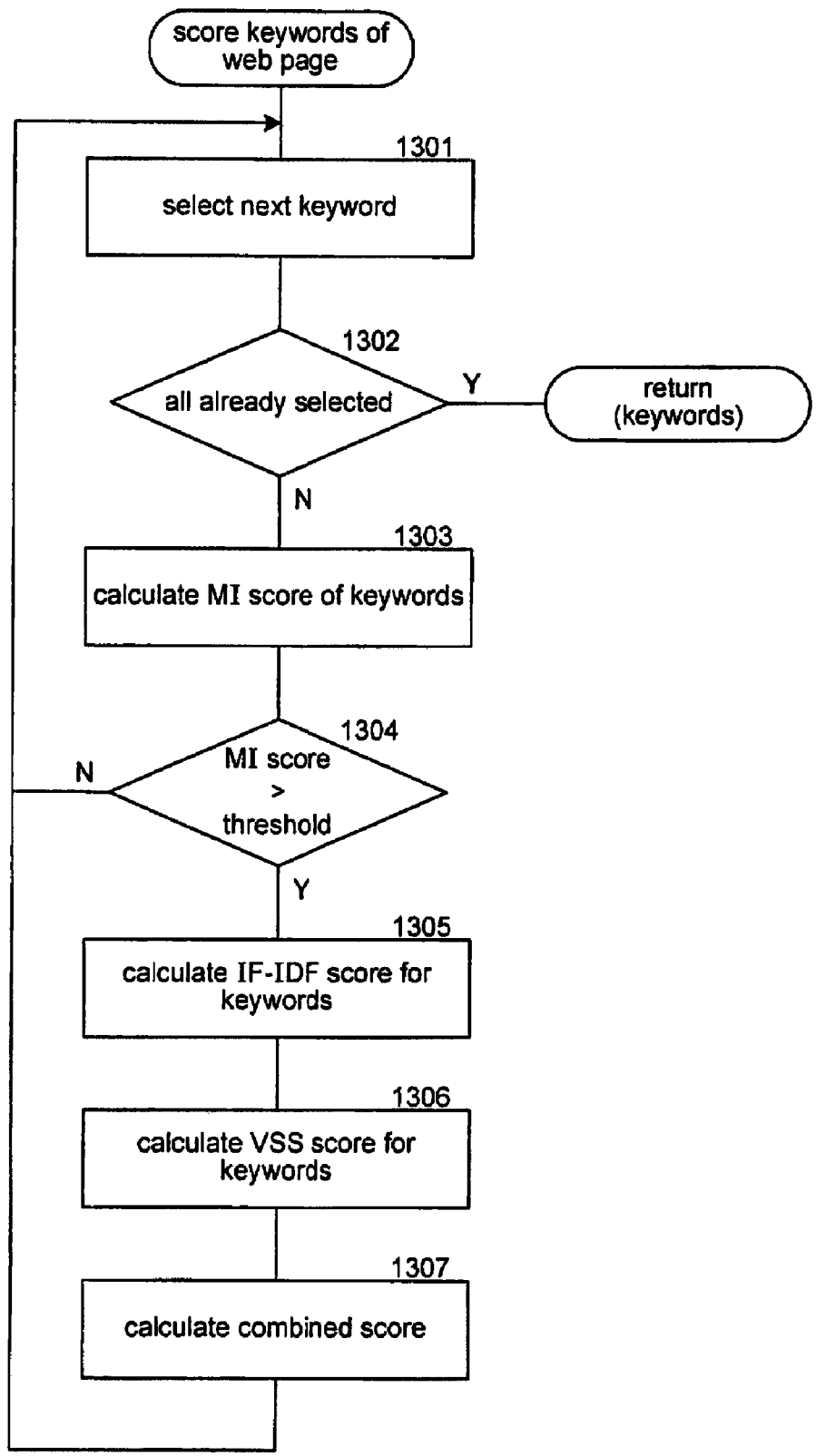
FIG. 13 is a flow diagram that illustrates the processing of the score keywords of web page component in one embodiment.

FIG. 13 is a flow diagram that illustrates the processing of the score keywords of web page component in one embodiment. The component is passed a web page, an image of the web pages, and keywords and scores the importance of each keyword to the image. The component uses a term frequency by inverse document frequency ("TF-IDF") score for each word of the collection of web pages. The component may calculate the term frequency by inverse document frequency score according to the following equation:

$$tf - idf_i = \frac{n_{id}}{n_d} \log \frac{N}{n_i} \quad (4)$$

where $tf-idf_i$ represents the score for word i, $n_{id}$ represents the number of occurrences of a word i on web page d, $n_d$ represents the total number of words on web page d, $n_i$ represents the number of pages that contains word i, and N represents the number of web pages in the collection of web pages. In blocks 1301-1307, the component loops calculating a score for each phrase of the document. In block 1301, the component selects the next keyword, which can contain a single word or multiple words. In decision block 1302, if all the keywords have already been selected, then the component returns the score for the keyword, else the component continues at block 1303. In block 1303, the component calculates a mutual information score of the selected keyword as represented by the following equation:

$$MI(P) = \frac{\log(Occu(P)) \times N(|P|)}{Occu(\text{prefix}(P)) \times Occu(\text{suffix}(P))} \quad (5)$$

where MI(P) represents the mutual information score for keyword P, Occu(P) represents the count of occurrences of P on the web page, |P| represents the number of words P contains, N(|P|) represents the total number of keywords (i.e., phrases) with length less than |P| prefix(P) represents the prefix of P with length |P|−1, and suffix(P) represents the suffix of P with length |P|−1. In decision block 1304, if the mutual information score is greater than a threshold, then the component continues at block 1305, else the component loops to block 1301 to select the next keyword. If the mutual information score does not meet a threshold level, then the component considers the keyword to be unimportant and sets its score to 0. In block 1305, the component calculates the TF-IDF score for the selected keyword as the average of the TF-IDF score for the words of the keyword. In block 1306, the component calculates a visualization style score ("VSS") to factor in the visual characteristics of the keyword as represented by the following equation:

$$VSS(P) = \begin{cases} tf - idf_{Max}, & \text{if } P \text{ is in title, } alt \text{ text or } meta; \\ \frac{1}{4} tf - idf_{Max}, & \text{else if } P \text{ is in bold;} \\ \frac{1}{8} tf - idf_{Max}, & \text{else if } P \text{ is in a large font;} \\ 0, & \text{otherwise.} \end{cases} \quad (6)$$

where VSS(P) represents the VSS score for the keyword P and $tf-idf_{max}$ represents the maximum TF-IDF score of all keywords of the web page. The VSS is based on whether the keyword is in the title or in metadata and whether the keyword is in bold or in a large font. One skilled in the art will appreciate that other visual characteristics could be taken into consideration, such as position of a keyword on a page, closeness to an image, and so on. In block 1307, the component calculates a combined score for the selected keyword according to the following equation:

$$Y = b_0 + \sum_{j=1}^{3} b_j X_j \quad (7)$$

where X={tf−idf,MI,VSS} and the coefficients $b_0, \ldots, b_3$ are empirically determined. The component then loops to block 1301 to select the next keyword.

Figure 14:
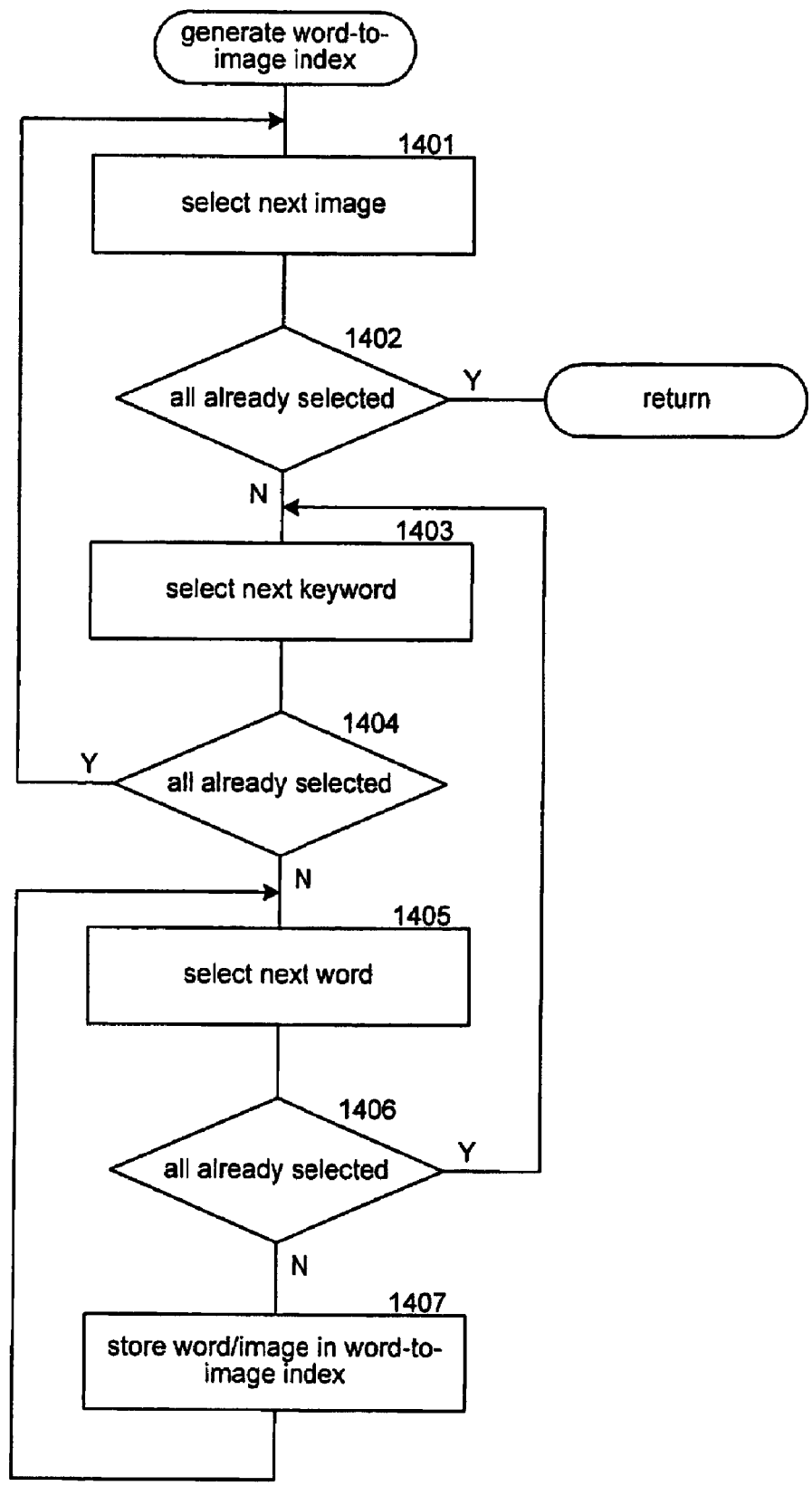
FIG. 14 is a flow diagram that illustrates the processing of the generate word-to-image index in one embodiment.

FIG. 14 is a flow diagram that illustrates the processing of the generate word-to-image index in one embodiment. The component may input the image-to-related-information index and add an entry to the word-to-image index for each word of each keyword for each image. In block 1401, the component selects the next image. In decision block 1402, if all the images have already been selected, then the component returns, else the component continues at block 1403. In block 1403, the component selects the next keyword for the selected image. In decision block 1404, if all the keywords have already been selected, then the component loops to block 1401 to select the next image, else the component continues at block 1405. In block 1405, the component selects the next word of the selected keyword. In decision block 1406, if all the words of the selected keyword have already been selected, then the component loops to block 1403 to select the next keyword of the selected image, else the component continues at block 1407. In block 1407, the component adds an entry to the word-to-image index that maps the selected words to the image identifier of the selected image. The component then loops to block 1405 to select the next word of the selected keyword.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, the multimodal query system may consider images to be duplicates when they are identical and when they are of the same content but from different points of view. An example of different points of view would be pictures of the same building from different angles or different distances. As used herein, the term "keyword" refers to a phrase of one or more words. For example, "yellow tulips" and "tulips" are both keywords. Accordingly, the invention is not limited except as by the appended claims.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A method in a computing device for generating a compact representation of an image, the method comprising:
   for each of a plurality of blocks of pixels of the image, calculating for the block a representative intensity level derived from intensities of the pixels of the block;
   performing a discrete transform on the representative intensity levels for the blocks to generate transformed coefficients;
   applying a principal component analysis to the transformed coefficients to generate PCA coefficients of a reduced dimensionality; and
   setting each bit of a vector with an element corresponding to a PCA coefficient based on the value of the PCA coefficient
   wherein the bits represent the compact representation of the image.

2. The method of claim 1 wherein the compact representation is a signature of the image.

3. The method of claim 2 including identifying images that are duplicates of a target image by comparing signatures of the images to the signature of the target image.

4. The method of claim 1 wherein the calculating of the representative intensity levels includes setting the pixels of the images to a grey scale and wherein the representative intensity level is an average intensity level for the pixels of a block.

5. The method of claim 1 wherein the transform is a discrete cosine transform and the transformed coefficients do not include a DC coefficient.

6. The method of claim 5 wherein the transformed coefficients are selected in a zigzag pattern.

7. The method of claim 1 wherein the calculating of the representative intensity levels includes setting the pixels of the images to a grey scale and wherein the representative intensity level is an average intensity level for the pixels of a block, wherein the discrete transform is a discrete cosine transform and the transformed coefficients are AC coefficients selected in a zigzag pattern, and wherein the bits are set based on whether the PCA coefficients are greater than or less than zero.

8. The method of claim 7 wherein the blocks include 64 pixels, wherein 48 AC coefficients are selected, and wherein the reduce dimensionality is 32.

9. A computer-readable storage device containing computer-executable instructions for controlling a computing device to generate a compact representation of an image, by a method comprising:
   for each of a plurality of blocks of pixels of the image, calculating for the block a representative intensity level derived from intensities of the pixels of the block;
   performing a discrete transform on the representative intensity levels for the blocks to generate transformed coefficients;
   applying a principal component analysis to the transformed coefficients to generate PCA coefficients of a reduced dimensionality; and
   setting each bit of a vector with an element corresponding to a PCA coefficient based on the value of the PCA coefficient
   wherein the bits represent the compact representation of the image.

10. The computer-readable storage device of claim 9 wherein the compact representation is a signature of the image.

11. The computer-readable storage device of claim 10 including identifying images that are duplicates of a target image by comparing signatures of the images to the signature of the target image.

12. The computer-readable storage device of claim 9 wherein the calculating of the representative intensity levels includes setting the pixels of the images to a grey scale and wherein the representative intensity level is an average intensity level for the pixels of a block.

13. The computer-readable storage device of claim 9 wherein the transform is a discrete cosine transform and the transformed coefficients do not include a DC coefficient.

14. The computer-readable storage device of claim 13 wherein the transformed coefficients are selected in a zigzag pattern.

15. The computer-readable storage device of claim 9 wherein the calculating of the representative intensity levels includes setting the pixels of the images to a grey scale and wherein the representative intensity level is an average intensity level for the pixels of a block, wherein the discrete transform is a discrete cosine transform and the transformed coefficients are AC coefficients selected in a zigzag pattern, and wherein the bits are set based on whether the PCA coefficients are greater than or less than zero.

16. The computer-readable storage device of claim 15 wherein the blocks include 64 pixels, wherein 48 AC coefficients are selected, and wherein the reduce dimensionality is 32.

* * * * *